United States Patent [19]

Kobayashi et al.

[11] Patent Number: 4,483,141

[45] Date of Patent: Nov. 20, 1984

[54] STIRLING CYCLE ENGINE HAVING SHAFT SEAL MEANS

[75] Inventors: Daisaku Kobayashi; Tsunesaku Itaba, both of Kashiwazaki; Yutaka Momose, Anjyo, all of Japan

[73] Assignees: Kabushiki Kaisha Riken, Tokyo; Aisin Seiki Kabushika, Kariya, both of Japan

[21] Appl. No.: 517,915

[22] Filed: Jul. 28, 1983

[30] Foreign Application Priority Data

Jul. 31, 1982 [JP] Japan .......................... 57-116630[U]

[51] Int. Cl.[3] .......................... F02G 1/00; F16J 15/56

[52] U.S. Cl. .......................................... 60/517; 277/3; 277/15

[58] Field of Search ...................... 60/517, 525; 277/3, 277/15, 27

[56] References Cited

U.S. PATENT DOCUMENTS

| | | | |
|---|---|---|---|
| 3,667,349 | 6/1972 | Siebert et al. | 60/517 X |
| 3,848,877 | 11/1974 | Bengtsson et al. | 60/517 X |
| 4,146,237 | 3/1979 | Bergman | 277/3 |
| 4,247,121 | 1/1981 | Bergman | 277/3 |
| 4,428,584 | 1/1984 | Shapiro | 277/3 |

*Primary Examiner*—Stephen F. Husar
*Attorney, Agent, or Firm*—Burns, Doane, Swecker and Mathis

[57] ABSTRACT

A stirling cycle engine including a working piston defining a working chamber, a crankshaft located in a crankchamber, a connecting rod connecting the working chamber with the crankshaft, the connecting rod being passed through intermediate members. A gas seal structure is provided in the intermediate members around the connecting rod, the gas seal structure including a first oil chamber and a second oil chamber, the second oil chamber being located closer to the crankchamber than the first oil chamber, a resilient sealing ring disposed between the first and second oil chambers and having an outer surface tapered toward the crankchamber to reduce diameter thereof, a spring for biasing the sealing ring toward the crankchamber so that the outer surface of the sealing ring is urged to an opposing surface formed in one of the intermediate members. The first oil chamber is subjected to a pressure proximity to a minimum pressure produced in the working chamber, whereas the second oil chamber to the atmospheric pressure.

6 Claims, 1 Drawing Figure

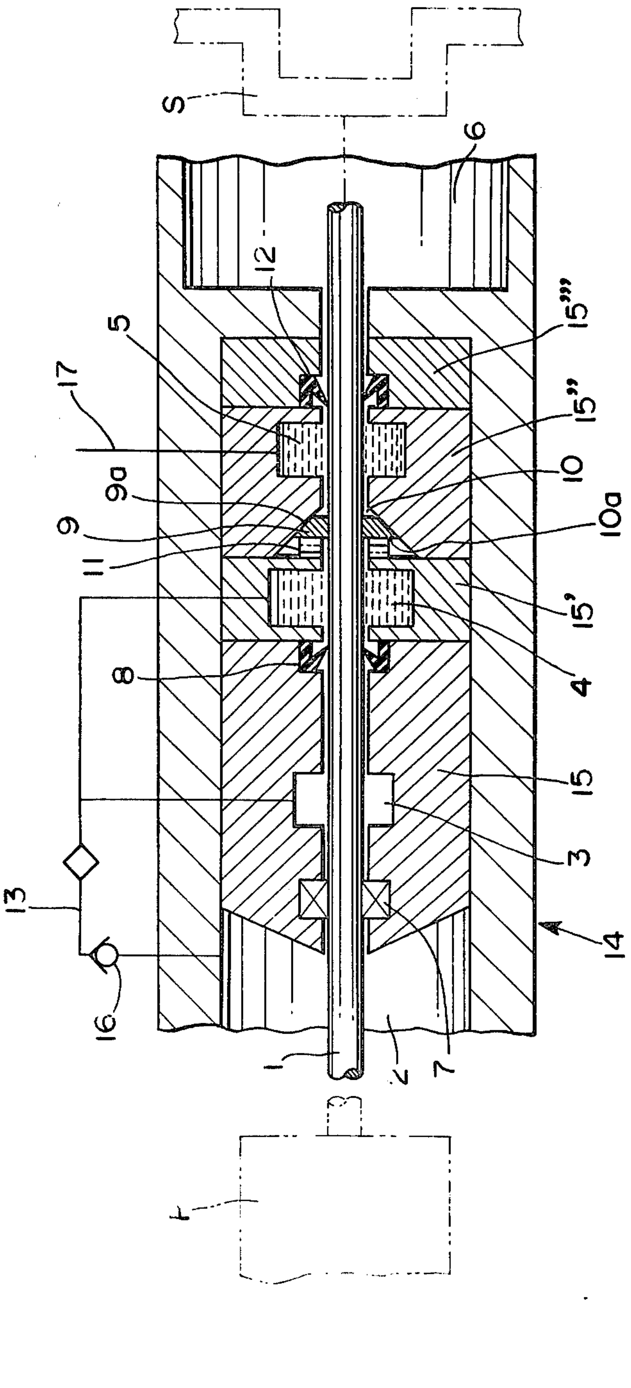
S
6
12
5
17
15'''
15''
10
9a
9
11
10a
15'
4
8
15
3
13
14
16
1
2
7
F

STIRLING CYCLE ENGINE HAVING SHAFT SEAL MEANS

The present invention relates to shaft sealing means for engines, and more particularly to shaft sealing means for stirling cycle engines.

Conventionally, stirling cycle engines have working pistons which are connected through connecting rods with crankshafts. The connecting rods are arranged to pass through intermediate wall members and sealing means are provided around the rods for ensuring gas-tightness. In such stirling cycle engines, the gas-tight seals at the connecting rods are very important in view of the fact that the outputs of the engines are proportional to the mean value of pressures in the working chambers which are defined by the working pistons so that prevention of gas leakage along the connecting rods is an essential measure of ensuring stability of outputs.

In known structures of the stirling cycle engines, the intermediate wall member is provided with an oil chamber so that the working gas which has leaked through the connecting rod is captured at the oil chamber and returned to the working chamber. It should however be noted that this type of gas seal is inconvenient in that the oil in the oil chamber is apt to leak to the crank-chamber so that the oil level in the oil chamber is gradually lowered. Therefore, in the known type of gas seal, it has been necessary to provide auxiliary means for capturing the leaking oil and returning it to the oil chamber. It will therefore be understood that the conventional gas seal device is complicated in structure, bulky in size and expensive in cost.

It is therefore an object of the present invention to provide shaft sealing means for stirling cycle engines which is simple in structure and less expensive as compared with the conventional gas sealing means.

Another object of the present invention is to provide shaft sealing means for stirling cycle engines which does not require a large space.

According to the present invention, the above and other objects can be accomplished by a stirling cycle engine including working piston means defining working chamber means, crankshaft means located in crankchamber means, connecting rod means connecting the working chamber means with said crankshaft means, said connecting rod means being passed through intermediate member means, gas seal means provided in said intermediate member means around said connecting rod means, said gas seal means including first oil chamber means and second oil chamber means, said second oil chamber means being located closer to said crankchamber means than said first oil chamber means, resilient sealing ring means disposed between said first and second oil chamber means and having an outer surface tapered toward said crankchamber means to reduce diameter thereof, spring means for biasing said sealing ring means toward said crankchamber means so that said outer surface of the sealing ring means is urged to an opposing surface formed in said intermediate member means, means for introducing into said oil chamber means a pressure proximity to a minimum pressure produced in said working chamber means, means for opening the second oil chamber means to atmosphere. The sealing ring means may be made of a plastic material and the opposing surface in the intermediate member means may be tapered in the same way as the outer surface of the sealing ring means.

The above and other objects and features of the present invention will become apparent from the following descriptions of a preferred embodiment taking reference to the accompanying drawing which is a fragmentary sectional view of a stirling cycle engine having a shaft seal structure in accordance with one embodiment of the present invention.

Referring to the drawing, there is shown a stirling cycle engine 14 which has a working chamber 2 and a crankchamber 6. Between the working chamber 2 and the crankchamber 6, there are disposed four intermediate members 15, 15', 15'' and 15''' and a connecting rod 1 is passed through the intermediate members. The connecting rod 1 connects a working piston P with a crankshaft S. The intermediate member 15 is located adjacent to the working chamber 2 and provided with a gas seal 7 at an end adjacent to the working chamber 2. The intermediate member 15 is further provided at an intermediate portion with a gas chamber 3 and at the other end with an oil scraper ring 8. The intermediate member 15' which is located between the members 15 and 15'' is formed with a first oil chamber 4. The intermediate member 15'' is located between the members 15' and 15''' and formed with a second oil chamber 5. The intermediate member 15''' is located adjacent to the crankchamber 6 and provided with an oil seal ring 12. In the intermediate member 15'', there is formed a cavity 10 having a tapered surface **10*a* which is encircling the connecting rod 1 and tapered to decrease its diameter toward the crankchamber 6. In the cavity 10, there is disposed a sealing ring made of a resilient material such as a plastic material. The sealing ring 9 has an outer surface 9*a* which is tapered toward the crankchamber 6 as the tapered surface 10*a* is, and a spring 11 is disposed in the cavity 10 to force the sealing ring 9 so that the outer surface 9*a* is urged toward the tapered surface 10*a* of the intermediate member 15''**.

The gas chamber 3 and the first oil chamber 4 are communicated with the working chamber 2 through a conduit 13 having a check valve 16 which opens only toward the working chamber 2. The gas chamber 3 and the first oil chamber 4 are therefore maintained at a pressure close to the minimum pressure produced in the working chamber 2. The second oil chamber 5 is opened to the atmosphere through a conduit 17 so that the second oil chamber 5 is subjected to the atmospheric pressure.

In the gas sealing structure described above, the gas chamber 3 and the first oil chamber 4 are subjected to a pressure proximity to the minimum value of the pressure produced in the working chamber 2 as previously described. Therefore, the gas leaking from the working chamber 2 along the connecting rod 1 is captured at the first oil chamber 4. The possible oil leakage from the first oil chamber 4 is sealed by the sealing ring 9. Very slight amount of oil may pass through the sealing ring 9 when the connecting rod 1 reciprocates, however, such leaking oil is captured by the second oil chamber 5 which is under the atmospheric pressure. The oil in the second oil chamber 5 is returned to the first oil chamber 4 when the connecting rod 1 moves toward the working chamber 2 because at this instance the sealing function of the sealing ring 9 is weakened. Therefore, it is possible to maintain the oil in the oil chambers for a prolonged time.

The invention has thus been shown and described with reference to a specific embodiment, however, it should be noted that the invention is in no way limited to the details of the illustrated structures but changes and modifications may be made without departing from the scope of the appended claims.

We claim:

1. A stirling cycle engine including working piston means defining working chamber means, crankshaft means located in crankchamber means, connecting rod means connecting the working chamber means with said crankshaft means, said connecting rod means being passed through intermediate member means, gas seal means provided in said intermediate member means around said connecting rod means, said gas seal means including first oil chamber means and second oil chamber means, said second oil chamber means being located closer to said crankchamber means than said first oil chamber means, resilient sealing ring means disposed between said first and second oil chamber means and having an outer surface tapered toward said crankchamber means to reduce diameter thereof, spring means for biasing said sealing ring means toward said crankchamber means so that said outer surface of the sealing ring means is urged to an opposing surface formed in said intermediate member means, means for introducing into said first oil chamber means a pressure proximity to a minimum pressure produced in said working chamber means, means for opening the second oil chamber means to atmosphere.

2. A stirling cycle engine in accordance with claim 1 in which said sealing ring means is made of a resilient plastic material.

3. A stirling cycle engine in accordance with claim 1 in which said intermediate member means is formed with cavity means having said opposing surface which is tapered to decrease diameter toward said crankchamber means, said sealing ring means being disposed in said cavity means.

4. A stirling cycle engine in accordance with claim 1 in which said intermediate member means is provided between said first oil chamber means and said working chamber means with gas chamber means.

5. A stirling cycle engine in accordance with claim 4 which includes conduit means for connecting said gas chamber means with said first oil chamber means so that the both chamber means are subjected substantially to the same pressure.

6. A stirling cycle engine in accordance with claim 1 in which said introducing means is conduit means connecting said first oil chamber means with said working chamber means, and check valve means provided in said conduit means and capable to open only toward the working chamber means.

* * * * *